(12) United States Patent
Yeager et al.

(10) Patent No.: US 8,248,755 B2
(45) Date of Patent: Aug. 21, 2012

(54) POLYIMIDES AND THIN FILMS, ELECTRONIC ARTICLES AND CAPACITORS COMPRISING THESE, AND METHODS OF MAKING THEM

(75) Inventors: Gary William Yeager, Rexford, NY (US); Norberto Silvi, Clifton Park, NY (US); Patricia Chapman Irwin, Altamont, NY (US); Robert Colin McTigue, Coeymans Hollow, NY (US)

(73) Assignee: General Electric Company, Niskayuna, NY (US)

( * ) Notice: Subject to any disclaimer, the term of this patent is extended or adjusted under 35 U.S.C. 154(b) by 271 days.

(21) Appl. No.: 12/771,907

(22) Filed: Apr. 30, 2010

(65) Prior Publication Data

US 2011/0267739 A1  Nov. 3, 2011

(51) Int. Cl.
 *H01G 4/08* (2006.01)
(52) U.S. Cl. ........ 361/323; 361/516; 361/517; 361/519; 361/321.5; 528/65; 528/71; 528/170; 528/203; 528/423
(58) Field of Classification Search .................. 361/323, 361/516–519, 321.5; 528/44–45, 170–173, 528/179, 203, 423; 525/420, 422, 425
 See application file for complete search history.

(56) References Cited

U.S. PATENT DOCUMENTS

| 5,571,875 | A | * | 11/1996 | Tsutsumi et al. | 525/425 |
| 5,580,918 | A | * | 12/1996 | Morita et al. | 524/413 |
| 6,887,967 | B2 | * | 5/2005 | Ichinose et al. | 528/170 |
| 7,074,882 | B2 | * | 7/2006 | Hikita et al. | 528/353 |
| 7,247,367 | B2 | * | 7/2007 | Nishinaka et al. | 428/220 |
| 7,638,259 | B2 | * | 12/2009 | Goto et al. | 430/270.1 |

FOREIGN PATENT DOCUMENTS

EP        315025 A1    5/1989

* cited by examiner

*Primary Examiner* — Nguyen T Ha
(74) *Attorney, Agent, or Firm* — Joseph J. Christian

(57) ABSTRACT

A polyimide resin is provided. The polyimide resin comprises the reaction product of a polyimide resin and an amine comprising a $C_{1-10}$ hydrocarbon substituted with CN, F, $SO_2$, SO, S, $SO_3$, $SO_3^-$, PO, $PO_2H$, $PO_3H$, $PO_2^-$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, $OTi(OR^4)_3$, or $OSi(OR^4)_3$ or combinations of these, wherein $R^4$ is a $C_{1-10}$ aliphatic or aromatic hydrocarbon. The resin may be used to provide a thin film that in turn, may advantageously be used to form, wholly or in part, articles such as capacitors, sensors, batteries, flexible printed circuit boards, keyboard membranes, motor/transformer insulations, cable wrappings, industrial tapes, interior coverage materials, and the like. In particular, a capacitor comprising the thin film and methods of making the same are also provided.

6 Claims, 7 Drawing Sheets

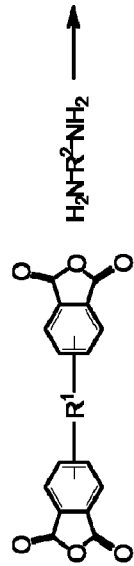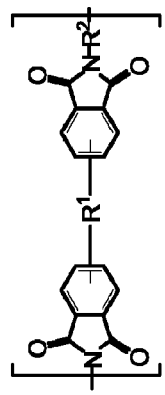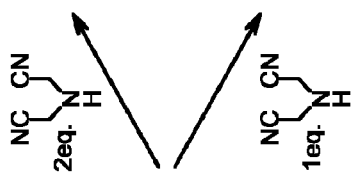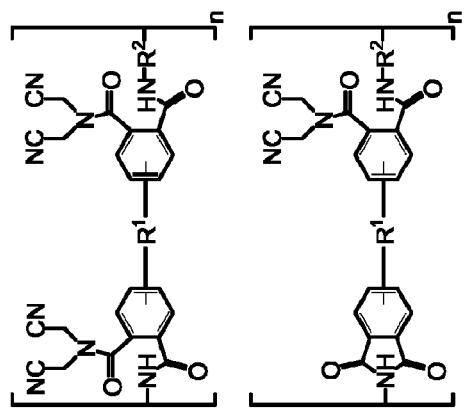
FIG. 1A
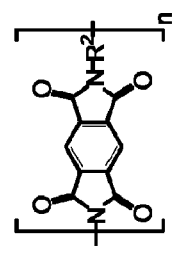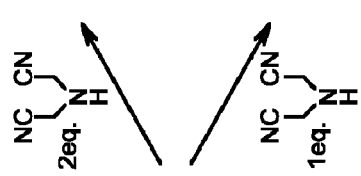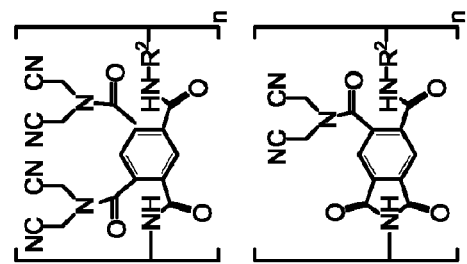
FIG. 1B

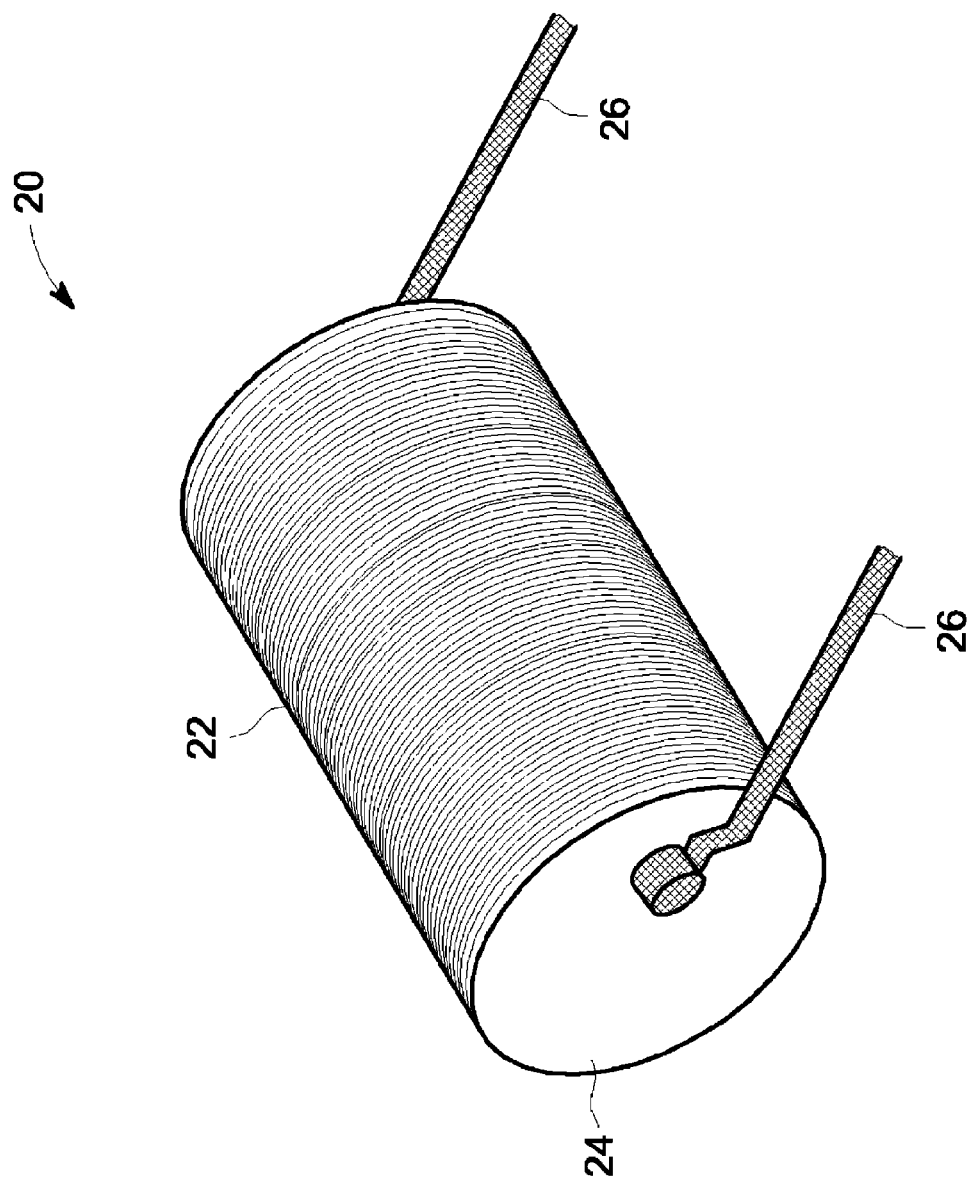

POLYIMIDES AND THIN FILMS, ELECTRONIC ARTICLES AND CAPACITORS COMPRISING THESE, AND METHODS OF MAKING THEM

BACKGROUND

This invention generally relates to polyimide resins. More specifically, the invention relates to such resins, and articles comprising the same, useful in high temperature and/or dielectric applications.

Over the last decade, significant increases in capacitor reliability have been achieved through a combination of advanced manufacturing techniques and new materials. Greatly enhanced performance has been obtained particularly in so-called film capacitors. Film capacitors can be classified into three types based on the manufacturing technology, namely, film and foil capacitors, metallized film capacitors and mixed technology film capacitors.

Generally, metallized film capacitors consist of two metal electrodes separated by a layer of plastic film. The metallized plastic film is constructed by vacuum depositing metal film onto a layer of plastic film. This would offer compact capacitor structure, self-clearing capability, longer lifetime, and higher energy density. Some of the commonly used plastic films are polypropylene and polyetherimide films. The metal film layer is typically extremely thin, in the order of about 200-500 angstroms and is typically aluminum, zinc or alloys of the same. Compared to other types of capacitors, metallized film capacitors provide advantages in size, simplicity, and cost of manufacturing, and hence have been widely used in the power electronics industry.

While significant improvements have been made in metallized film capacitors, certain issues, such as thermal stability and reduced lifetime continue to present challenges to their widespread use. For example, polyimides, such as polyetherimides, made from dianhydrides and diamines have been used in the past for the manufacture of thin film capacitors, as have polypropylene, polycarbonate and certain polyesters. Although polyimides and polyetherimides have relatively high glass transition temperatures (217° C. and higher) the glass transition temperatures of polypropylene, polycarbonate and polyesters are lower (usually less than 150° C.) and can limit the continuous-use, working temperatures of articles made from these resins to about 120° C. or less. Further, the relatively low dielectric constant of each of these resins limits the stored energy capacitors made from them to about 1 Joule/cc.

New polymeric resins would thus desirably be provided, having higher dielectric constants, and capable of operating at temperatures in excess of 120° C. Such resins would be expected to be useful in a wide variety of articles, including thin film capacitors, and metalized thin film capacitors in particular.

BRIEF DESCRIPTION OF THE INVENTION

There is provided a polyimide resin comprising at least one residue selected from Formulas 1-4:

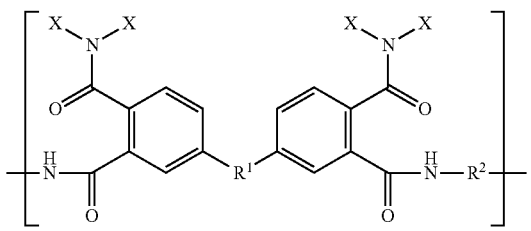

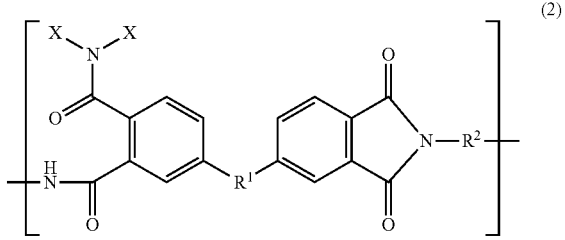

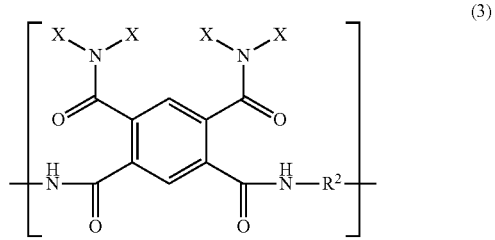

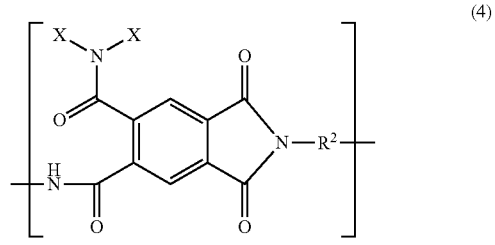

wherein each X is independently a $C_{1-10}$ hydrocarbon unsubstituted or substituted with CN, F, $SO_2$, SO, S, $SO_3H$, $SO_3^-$, PO, $PO_2H$, $PO_3H$, $PO_2^-$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, $OTi(OR^3)_3$, $OSi(OR^3)_3$ wherein $R^3$ is a $C_{1-10}$ aromatic or aliphatic hydrocarbon, and at least one X is a $C_{1-10}$ hydrocarbon substituted with a CN, F, $SO_2$, SO, S, $SO_3H$, $SO_3^-$, PO, $PO_2H$, $PO_3H$, $PO_2$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, $OTi(OR^3)_3$, $OSi(OR^3)_3$ wherein $R^3$ is a $C_{1-10}$ aromatic or aliphatic hydrocarbon, $R^1$ is selected from the group consisting of a carbon-carbon single bond, a heteroatom containing group, the residuum of a bisphenol or a $C_1$-$C_{50}$ hydrocarbon unsubstituted or substituted with an atom or group selected from the group consisting of O, S, O=S=O, S=O, P=O, C=O, —$CO_2$—, —CONH—, —$CONH_2$, —NHCOHN—, —OCONH—, —$OCO_2$—, N, —NH, —$NH_2$, —$NO_2$, —Cl, —F, —CSNH—, —$CSNH_2$, —NHCSNH—, and/or —CN and $R^2$ is selected from the residuum of a diamine and a $C_1$-$C_{50}$ hydrocarbon unsubstituted or substituted with an atom or group selected from the group consisting of O, S, O=S=O, S=O, P=O, C=O, —$CO_2$—, —CONH—, —$CONH_2$—NHCOHN—, —OCONH—, —$OCO_2$—, N, —NH, —$NH_2$, —$NO_2$, —Cl, —F, —CSNH—, —$CSNH_2$, —NHCSNH—, and/or —CN.

There is also provided a polyimide resin comprising the reaction product of a polyimide resin and an amine comprising a $C_{1-10}$ hydrocarbon substituted with CN, F, $SO_2$, SO, S, $SO_3H$, $SO_3^-$, PO, $PO_2H$, $PO_3H$, $PO_2$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, $OTi(OR^3)_3$, or $OSi(OR^3)_3$ or combinations of these wherein $R^3$ is a $C_{1-10}$ aromatic or aliphatic hydrocarbon.

A capacitor is also provided comprising a thin film of a polyimide resin comprising at least one residue selected from Formulas 1-4:

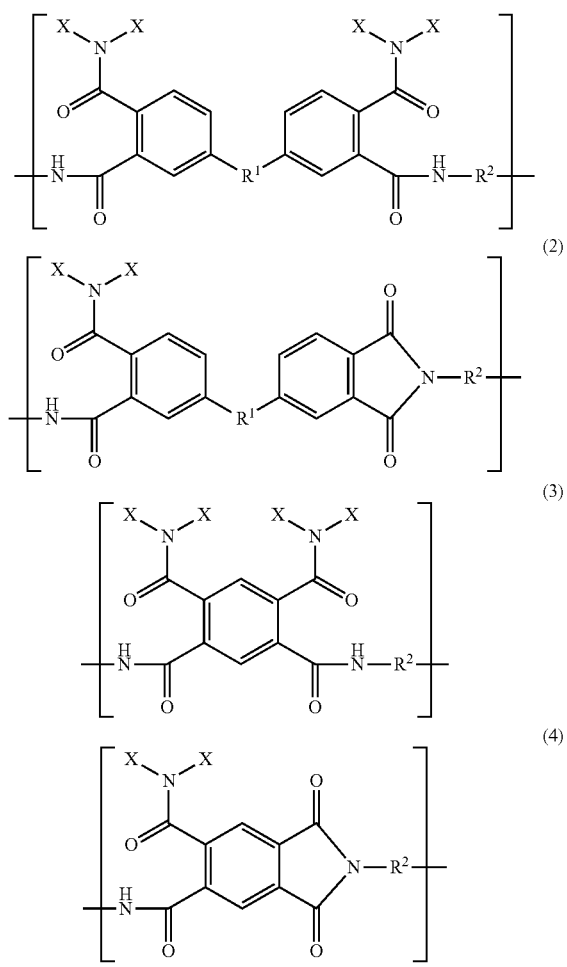

wherein each X is independently a $C_{1-10}$ hydrocarbon unsubstituted or substituted with CN, F, $SO_2$, SO, S, $SO_3H$, $SO_3^-$, PO, $PO_2H$, $PO_3H$, $PO_2^-$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, $OTi(OR^3)_3$, $OSi(OR^3)_3$ wherein $R^3$ is a $C_{1-10}$ aromatic or aliphatic hydrocarbon and at least one X is a $C_{1-10}$ hydrocarbon substituted with a CN, F, $SO_2$, SO, S, $SO_3H$, $SO_3^-$, PO, $PO_2H$, $PO_3H$, $PO_2^-$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, $OTi(OR^3)_3$, $OSi(OR^3)_3$ wherein $R^3$ is a $C_{1-10}$ aromatic or aliphatic hydrocarbon, $R^1$ is selected from the group consisting of a carbon-carbon single bond, a heteroatom containing group, the residuum of a bisphenol or a $C_1$-$C_{50}$ hydrocarbon unsubstituted or substituted with an atom or group selected from the group consisting of O, S, O=S=O, S=O, P=O, C=O, —$CO_2$—, —CONH—, —$CONH_2$, —NHCOHN—, —OCONH—, —$OCO_2$—, N, —NH, —$NH_2$, —$NO_2$, —Cl, —F, —CSNH—, —$CSNH_2$, —NHCSNH—, and/or —CN and $R^2$ is selected from the residuum of a diamine and a $C_1$-$C_{50}$ hydrocarbon unsubstituted or substituted with an atom or group selected from the group consisting of O, S, O=S=O, S=O, P=O, C=O, —$CO_2$—, —CONH—, —$CONH_2$—NHCOHN—, —OCONH—, —$OCO_2$—, N, —NH, —$NH_2$, —$NO_2$, —Cl, —F, —CSNH—, —$CSNH_2$, —NHCSNH—, and/or —CN.

A capacitor is also provided comprising a thin film of a polyimide resin comprising the reaction product of a polyimide resin and an amine comprising a $C_{1-10}$ hydrocarbon substituted with CN, F, $SO_2$, SO, S, $SO_3H$, $SO_3^-$, PO, $PO_2H$, $PO_3H$, $PO_2^-$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, $OTi(OR^3)_3$, or $OSi(OR^3)_3$, wherein $R^3$ is a $C_{1-10}$ aromatic or aliphatic hydrocarbon, or combinations of these.

A capacitor is also provided wherein the capacitor comprises a thin film of a polyimide resin comprising at least one sulfonyl group and at least one inorganic filler.

A method of making a polyimide resin is also provided. The method comprises reacting a polyimide resin with an amine comprising a $C_{1-10}$ hydrocarbon substituted with CN, F, $SO_2$, SO, S, $SO_3H$, $SO_3^-$, PO, $PO_2H$, $PO_3H$, $PO_2^-$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, $OTi(OR^3)_3$, or $OSi(OR^3)_3$, wherein $R^3$ is a $C_{1-10}$ aromatic or aliphatic hydrocarbon, or combinations of these.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1A is a schematic illustration of the preparation of a polyimide resin according to one embodiment; and FIG. 1B is a schematic illustration of the preparation of a polyimide resin according to one embodiment.

FIG. 2 is a diagrammatic illustration of an exemplary metallized film capacitor in accordance with aspects of the invention;

DETAILED DESCRIPTION OF THE INVENTION

Figure 3:
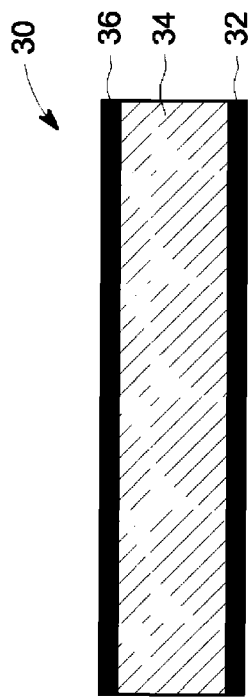
FIG. 3 is a cross-sectional view of a portion of a metallized film capacitor, illustrating a dielectric layer comprising a polyimide resin in accordance with one aspect of the invention.

The compositional ranges disclosed herein are inclusive and combinable (e.g., ranges of "up to about 25 wt %", or, more specifically, "about 5 wt % to about 20 wt %", are inclusive of the endpoints and all intermediate values of the ranges). Weight levels are provided on the basis of the weight of the entire composition, unless otherwise specified; and ratios are also provided on a weight basis. Moreover, the term "combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about"

used in connection with a quantity is inclusive of the stated value, and has the meaning dictated by context, (e.g., includes the degree of error associated with measurement of the particular quantity). The suffix "(s)" as used herein is intended to include both the singular and the plural of the term that it modifies, thereby including one or more of that term (e.g., "the refractory element(s)" may include one or more refractory elements). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

Two of the dielectric properties considered herein are dielectric constant and breakdown strength The "dielectric constant" of a material is a ratio of the capacitance of said material to the capacitance of a vacuum, it is generally measured by completely filling the space between two parallel electrodes and measuring the resulting capacitance, then ratioing this value with the capacitance of the same configuration of electrodes in a vacuum. As used herein, "breakdown strength" refers to a measure of dielectric breakdown resistance of a dielectric material under an applied AC or DC voltage. The applied voltage prior to breakdown is divided by thickness of the dielectric material to give the breakdown strength. It is generally measured in units of potential difference over units of length, such as kilovolts per millimeter (kV/mm), or volts per micron (V/micron). The "dissipation factor (Df)" of a dielectric is a measure of the electric loss in a dissipative system. If a capacitor is used in an AC circuit, the dissipation factor due to the non-ideal capacitor is expressed as "tan delta", which is the ratio of the resistive power loss in the equivalent series resistance (ESR) to the reactive power oscillating in the capacitor.

The polyimide resins described herein comprise at least one residue selected from Formulas 1-4:

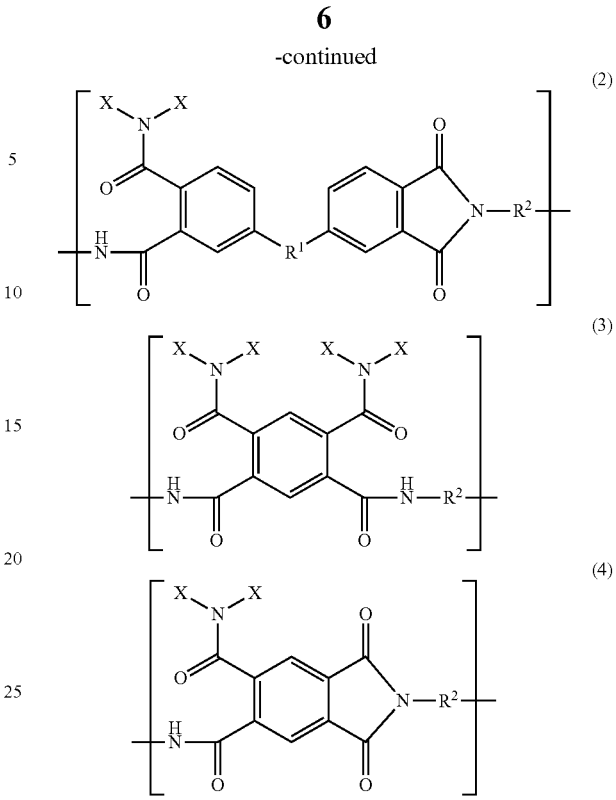

wherein each X is independently CN, F, $SO_2$, SO, S, $SO_3H$, $SO_3^-$, PO, $PO_2H$, $PO_3H$, $PO_2^-$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, $OTi(OR^3)_3$, $OSi(OR^3)_3$ wherein $R^3$ is a $C_{1-10}$ aromatic or aliphatic hydrocarbon and at least one X is CN, F, $SO_2$, SO, S, $SO_3H$, $SO_3^-$, PO, $PO_2H$, $PO_3H$, $PO_2^-$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, $OTi(OR^4)_3$, $OSi(OR^4)_3$ wherein $R^3$ is a $C_{1-10}$ aromatic or aliphatic hydrocarbon, $R^1$ is selected from the group consisting of a carbon-carbon single bond, a heteroatom containing group, the residuum of a bisphenol or a $C_1$-$C_{50}$ hydrocarbon unsubstituted or substituted with an atom or group selected from the group consisting of O, S, O=S=O, S=O, P=O, C=O, —$CO_2$—, —CONH—, —$CONH_2$, —NHCOHN—, —OCONH—, —$OCO_2$—, N, —NH, —$NH_2$, —$NO_2$, —Cl, —F, —CSNH—, —$CSNH_2$, —NHCSNH—, and/or —CN and $R^2$ is selected from the residuum of a diamine and a $C_1$-$C_{50}$ hydrocarbon unsubstituted or substituted with an atom or group selected from the group consisting of O, S, O=S=O, S=O, P=O, C=O, —$CO_2$—, —CONH—, —$CONH_2$—NHCOHN—, —OCONH—, —$OCO_2$—, N, —NH, —$NH_2$, —$NO_2$, —Cl, —F, —CSNH—, —$CSNH_2$, —NHCSNH—, and/or —CN.

In some embodiments, the polyimide resin may be according to Formula 5:

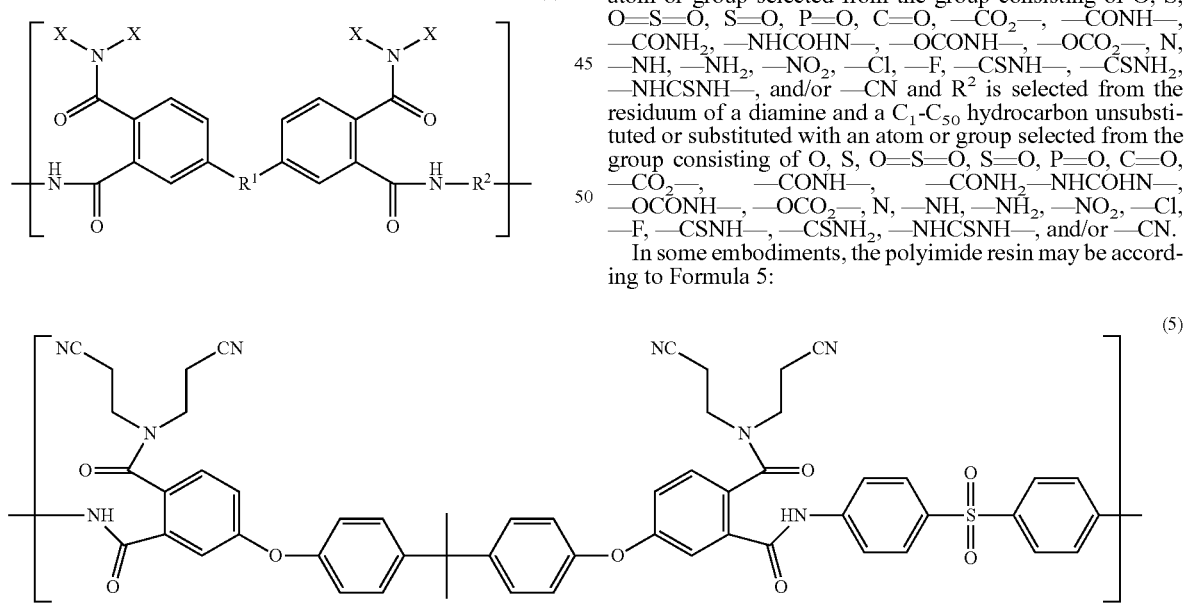

The polyimide resins provided advantageously exhibit a glass transition temperature and dielectric constant that renders them suitable for use in the fabrication of electronic articles, such as, e.g., thin film capacitors, including metallized thin film capacitors. More particularly, the polyimide resins have glass transition temperatures greater than 150° C., greater than 170° C., greater than 190° C., and in certain embodiments, as high as 250° C. or even higher. The dielectric constant is also surprisingly increased in thin films prepared from the polyimide resins, e.g., to as at least about 2.75, or about 3.0, or about 3.25, or about 3.5, or about 3.75, or about 4.0, or even about 4.25, or even as high as 4.4. These increases are further provided without appreciably affecting the dielectric loss or breakdown strength of the polyimide resins.

The polyimide resins may be prepared using a commercially available polyimide (such as any of the ULTEM® resins, commercially available from Sabic Innovative Plastics™), or using a polyimides that are generally known to the art. Examples of such polyimides include, but are not limited to, those disclosed in U.S. Pat. Nos. 3,803,085, 3,833,544, 3,998,840, 4,324,882, 4,011,198, 4,073,773, 3,991,004, 3,905,942, 4,221,897, 4,417,044, 4,910,288, each of these being incorporated by reference herein in their entirety for any and all purposes.

Or, the polyimide to be functionalized may synthesized in situ by any method known to those of ordinary skill in the art. One such method involves the known reaction of diamines with dianhydrides, as has been described, e.g., in U.S. Pat. No. 7,339,009 to Yeager, incorporated by reference herein for any and all purposes.

Such methods typically make use of diamines such as meta-phenylenediamine; para-phenylenediamine; bis(4-aminophenyl)-2,2-propane; 4,4'-diaminodiphenyl, 3,4'-diaminodiphenyl, 4,4'-diaminodiphenyl ether; 3,4'-diaminodiphenyl ether, 3,3'-diaminodiphenyl ether, 4,4'-diaminodiphenyl sulfone, 3,4'-diaminodiphenyl sulfone, 3,3'-diaminodiphenyl sulfone, 4,4'-diaminodiphenyl sulfide; 3,4'-diaminodiphenyl sulfide; 4,4'-diaminodiphenyl ketone, 3,4'-diaminodiphenyl ketone, 4,4'-diaminodiphenyl methane; 4,4'-bis(4-aminophenoxy)biphenyl; 4,4'-bis(3-aminophenoxy)biphenyl, 1,5-diaminonaphthalene; 3,3-dimethylbenzidine; 3,3-dimethoxybenzidine; benzidine; bis(aminophenoxy)fluorene, 1,3-bis(3-aminophenoxy)benzene, 1,3-bis(4-aminophenoxy)benzene, 1,4-bis(4-aminophenoxy)benzene, bis(4-(4-aminophenoxy)phenyl)sulfone, bis(4-(3-aminophenoxy)phenyl)sulfone, 3,3'-diaminobenzophenone, 4,4'-diaminobenzophenone, 2,2'-bis(4-(4-aminophenoxy)phenyl)propane, 2,2-bis[4-(4-aminophenoxy)phenyl]hexafluoropropane, 4,4'-bis(aminophenyl)hexafluoropropane, diaminobenzanilide, and mixtures of two or more of the foregoing diamines.

Advantageously diamines include aromatic diamines and said aromatic diamines further comprising a sulfone or fluoroalkyl group may be used alone or in combination with any of the foregoing anhydrides to obtain a polyimide product having the desired combination of physical and chemical properties.

Typical dianhydrides useful for the preparation of polyimides that may be functionalized to provide functionalized polyimides according to the present invention include 4,4'-bis(3,4-dicarboxyphenoxy)diphenyl sulfone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl sulfone dianhydride; 2,2-bis(4-(3,4-dicarboxyphenoxy)phenyl)propane dianhydride; 4,4'-bis(3,4-dicarboxyphenoxy)diphenyl sulfide dianhydride; 4,4'-bis(3,4-dicarboxyphenoxy)benzophenone dianhydride; 2,2-bis([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 2-[4-(3,4-dicarboxyphenoxy)phenyl]-2-[4-(2,3-dicarboxyphenoxy)phenyl]prop-ane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; 1,4,5,8-naphthalenetetracarboxylic acid dianhydride; 3,4,3∝,4'-benzophenonetetracarboxylic acid dianhydride; 2,3,3',4'-benzophenonetetracarboxylic acid dianhydride; 3,3',4,4'-oxydiphthalic anhydride; 2,3,3',4'-oxydiphthalic anhydride; 3,3',4,4'-biphenyltetracarboxylic acid dianhydride; 2,3,3',4'-biphenyltetracarboxylic acid dianhydride; 2,3,2',3'-biphenyltetracarboxylic acid dianhydride; pyromellitic dianhydride; 3,4,3',4'-diphenylsulfonetetracarboxylic acid dianhydride; 2,3,3',4'-diphenylsulfonetetracarboxylic acid dianhydride; 1,4-bis(3,4-dicarboxyphenoxy)benzene dianhydride; 2,2-bis(3,4-dicarboxyphenyl)hexafluoropropane dianhydride; and mixtures comprising at least two of the foregoing dianhydrides.

Advantageously, aromatic dianhydrides, such as pyromellitic dianhydride, 1,4,5,8-naphthalenetetracarboxylic acid dianhydride or an anhydride bearing a ketone, sulfone or fluoroalkyl group may be used alone or in combination with any of the foregoing anhydrides and reacted with a diamine to produce a polyimide in accordance with some embodiments, having the desired combination of physical and chemical properties.

Examples of combinations of dianhydrides and diamines that may be used to provide polyimides which may then be functionalized to provide polyimides according to some embodiments include dianhydrides such as pyromellitic dianhydride, 4-(2,3-dicarboxyphenoxy)-4'-(3,4-dicarboxyphenoxy)benzophenone dianhydride, 4,4'-bis(3,4-dicarboxyphenoxy)diphenyl sulfone dianhydride, 2,2-bis(4-(3,4-dicarboxyphenoxy)phenyl)propane dianhydride, 2,2-bis(3,4-dicarboxyphenyl)hexafluoropropane dianhydride and diamines such as 4,4'-diaminodiphenyl sulfone meta-phenylenediamine, 4,4'-diaminodiphenyl ketone, 2,2-bis[4-(4-aminophenoxy)phenyl]hexafluoropropane, 4,4'-bis(aminophenyl)hexafluoropropane.

The desired polyimide, whether obtained commercially or synthesized, is combined with an amine comprising a $C_{1-10}$ hydrocarbon substituted with CN, F, $SO_2$, SO, S, $SO_3H$, $SO_3^-$, PO, $PO_2H$, $PO_3H$, $PO_2^-$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, $OTi(OR^3)_3$, or $OSi(OR^3)_3$, wherein $R^3$ is a $C_{1-10}$ aliphatic or aromatic hydrocarbon residue, or combinations of these, (hereinafter the "functionalized amine") to provide the polyimide comprising at least one residue selected from formulas 1-4, above.

In a preferred embodiment amine compounds containing a nitrile group according to Formula 6 are used as the functionalized amine:

wherein each $R^4$ is independently a $C_{1-10}$ hydrocarbon group ideally a $C_{1-2}$ alkylgroup, a is 1 or 2 and b is 3-x and c is 0-6. In some embodiments, organic compounds containing a nitrile and amino group and include aminoacetonitrile, 2,2'-iminobisacetonitrile, 2-aminopropanenitrile, 3,3'iminobispropiononitrile, aminopropiononitrile, N-methyl-aminopropionitrile, N-methyl aminoacetonitrile.

The polyimide and functionalized amine may be reacted to provide the functionalized polyimide resin. More particularly, the process is carried out by initially combining the two aforementioned compounds, i.e. the polyimide and the amine compound, ideally in the presence of a solvent or mixture of solvents. In some embodiments, the polyimide is combined with an amine compound containing a nitrile group in the presence of a halogenated or polar aprotic solvent to produce a nitrile-functionalized polyimide.

The time and temperature that the polyimide and the functionalized amine are contacted depends upon a number of variables including the concentration of reagents, their chemical structure, and the structure of the solvent or solvents employed, etc. The solvents utilized will desirably be solvents capable of dissolving the polyimide. Typically, these may include chlorinated solvents, aromatic solvents or polar aprotic solvents or such as methylene chloride, o-dichlorobenzene, N-methylpyrollidone, N,N-dimethylacetamide, N,N-dimethylformamide, dimethylsulfoxide, sulfolane or the combination of these.

The polyimide is ideally combined in a solvent such that the polymer concentration is from 5-35% and the amine is combined in an amount such that the molar ratio of the functional group (i.e., the $C_{1-10}$ hydrocarbon substituted with CN, F, $SO_2$, SO, S, $SO_3H$, $SO_3^-$, PO, $PO_2H$, $PO_3H$, $PO_2^-$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, OTi $(OR^3)_3$, or $OSi(OR^3)_3$ or combinations of these, wherein $R^3$ is as defined above) to imide carbonyl group is less than 10:1, ideally less than 4:1 and most preferably between 2:1 and 0.5:1. In some embodiments, the polyimide and solvent are combined at temperatures of from about 50° C. to about 100° C., or from about 70° C. to about 100° C. for periods of time varying from 0.1 hours to about 200 hours, or from about 2 hours to about 24 hours, or less than about 16 hours, or even less than about 5 hours. Under such conditions, the desired solvent and polyimide are capable of producing a homogeneous solution, as the presence of insoluble particles, if entrapped in the final functionalized polyimide film, may cause degradation of the dielectric and/or mechanical properties.

Under the above conditions the functionalized amine can react with the polyimide to form a covalent bond. One such reaction is shown in FIG. 1A, which shows the preparation of a polyimide and its theoretical reaction with 1 or 2 equivalents of a specific organic compound containing a nitrogen and a nitrile group, 2,2'iminobisacetonitrile. $R^1$ and $R^2$ are as defined above, i.e., $R^1$ is selected from the group consisting of a carbon-carbon single bond, a heteroatom containing group, the residuum of a bisphenol or a $C_1$-$C_{50}$ hydrocarbon unsubstituted or substituted with an atom or group selected from the group consisting of O, S, O=S=O, S=O, P=O, C=O, —$CO_2$—, —CONH—, —$CONH_2$, —NHCOHN—, —OCONH—, —$OCO_2$—, N, —NH, —$NH_2$, —$NO_2$, —Cl, —F, —CSNH—, —$CSNH_2$, —NHCSNH—, and/or —CN and $R^2$ is selected from the residuum of a diamine and a $C_1$-$C_{50}$ hydrocarbon unsubstituted or substituted with an atom or group selected from the group consisting of O, S, O=S=O, S=O, P=O, C=O, —$CO_2$—, —CONH—, —$CONH_2$—NHCOHN—, —OCONH—, —$OCO_2$—, N, —NH, —$NH_2$, —$NO_2$, —Cl, —F, —CSNH—, —$CSNH_2$, —NHCSNH—, and/or —CN.

Another such reaction is shown in FIG. 1B. More particularly, FIG. 1B shows the preparation of a polyimide B and its theoretical reaction with 1 or 2 equivalents of a specific organic compound containing a nitrogen and a nitrile group, 2,2'iminobisacetonitrile. $R^1$ and $R^2$ are as defined above, i.e., $R^1$ is selected from the group consisting of a carbon-carbon single bond, a heteroatom containing group, the residuum of a bisphenol or a $C_1$-$C_{50}$ hydrocarbon unsubstituted or substituted with an atom or group selected from the group consisting of O, S, O=S=O, S=O, P=O, C=O, —$CO_2$—, —CONH—, —$CONH_2$, —NHCOHN—, —OCONH—, —$OCO_2$—, N, —NH, —$NH_2$, —$NO_2$, —Cl, —F, —CSNH—, —$CSNH_2$, —NHCSNH—, and/or —CN and $R^2$ is selected from the residuum of a diamine and a $C_1$-$C_{50}$ hydrocarbon unsubstituted or substituted with an atom or group selected from the group consisting of O, S, O=S=O, S=O, P=O, C=O, —$CO_2$—, —CONH—, —$CONH_2$—NHCOHN—, —OCONH—, —$OCO_2$—, N, —NH, —$NH_2$, —$NO_2$, —Cl, —F, —CSNH—, —$CSNH_2$, —NHCSNH—, and/or —CN.

Any of the conventional additives for polyimides may also be added to the polyimide resins provided, and may be added in conventional amounts. Additives such as stabilizers, mold release agents, flow auxiliaries, antistatic agents, impact modifiers, flame retardants, colorants, fillers, may be added as desired in consideration of the end use of the polyimide. Suitable examples of such additives are described, e.g., in "Additives for Plastics Handbook", John Murphy, Elsevier, Oxford, 1999.

Particular examples of stabilizers include organic phosphites, phosphonates and phosphanes, and substituted benzotriazoles. Mold release agents may typically be exemplified by derivatives of long chain fatty acids such as pentaerythritol tetrastearate and glycerol monostearate. If used, stabilizers and/or mold release agents may typically be employed in amounts of from about 0.02 wt % to about 1 wt % based upon the total weight of the polyimide.

If flame retardants are desirably included in the polyimides, phosphate esters, such as triphenyl phosphate, resorcinol diphosphoric acid esters, bromine-containing compounds, such as brominated phosphoric acid esters, brominated oligocarbonates and polycarbonates, or salts of fluorinated organic sulfonic acids may be used.

Suitable impact modifiers include graft polymers comprising one or more graft bases chosen from at least one polybutadiene rubber, acrylate rubber, ethylene/propylene rubbers, and grafting monomers chosen from the group consisting of styrene, acrylonitrile or alkyl methacrylate, or interpenetrating siloxane and acrylate networks with grafter-on methyl methacrylate or styrene/acrylonitrile.

Any such additives can be added to the polymer melt individually or in any desired mixtures, or number of mixtures, or on isolation of the polymer or after melting polymer granules in a compounding step. Further, the additives or mixtures thereof may be added to the polymer melt as a solid, i.e., as one or more powders, or as a melt. Any additives may be incorporated into the polyimide by initially producing a master batch or mixtures of master batches of the additives or additive mixtures.

The polyimide resins provided herein may also comprise one or more fillers, such as organic or inorganic fillers of any shape and dimension. Suitable fillers include, but are not limited to, beryllium titanate, magnesium titanate, calcium titanate, strontium titanate, barium titanate, lead titanate, cadmium titanate, niobium titanate, strontium titanate, and organic titanates. In some embodiments, the polyimide resins may be filled with functionalized or unfunctionalized fillers of nanometer dimensions, e.g., from about 0.1 nm to about 1000 nm, to improve the properties of these resins even further. In embodiments wherein the fillers are functionalized, or otherwise compatible with the polyimide resin, the polyimide resins need not be functionalized as described herein to be useful in certain applications, e.g., as electronic articles, such as capacitors. Capacitors comprising such filled polyimide resins are also provided herein.

Polymers containing certain nanoparticles or nanofillers such as barium titanate, aluminum oxide ($Al_2O_3$) or silica have been found to show higher dielectric constant, and may be particularly well suited to the inventive films and capacitors. Particle filled polymers also could offer increased thermal conductivity and may be suitable for use in the invention. Films made from composite polyimide resins according to such embodiments may contain a relatively small amount (less than about 30 to 40 volume percent or so based upon the total weight of the resin) of the filler, which will desirably be uniformly dispersed into the polymer.

Any desired filler(s) can be added to the polyimide resin while the polyimide resin is being synthesized or in a subsequent step by using some type of mixing equipment, such as melt extruders. Melt extrusion is used to disperse the filler into the polymer, and to generate the melt to produce extrusion cast films. The melt extruders may be used in a number of configurations but typically employ either a single- or twin-screw to convey the molten resin and efficiently mix and disperse it with other components. However prepared, in those embodiments where fillers are desirably utilized, the method utilized to add the filler will desirably facilitate uniform distribution of the filler throughout the resin, which is expected to assist in the provision of the desired properties in the resulting resin.

The reaction to functionalize the polyimide may be carried out in any suitable reaction vessel, such as a stirred tank reactor, or in any combination of reaction vessels in a batch or semi-batch process. In some embodiments, the reaction may be carried out in one or more continuous flow reactors. The type of flow reactor is not particularly limited, and may be any reactor system which provides for the upstream introduction of the reaction mixture. In some embodiments, the flow reactor may comprise a series of tubular reactors. In other embodiments, the flow reactor may comprise a series of continuous stirred tank reactors.

The polyimide resins provided can have a weight average molecular weight (Mw) of from about 10,000 to about 200,000, or from about 15,000 to about 100,000, or from about 20,000 to about 80,000. Although the resins are suitable for use in a wide variety of applications, the relatively high molecular weight of these resins make them good candidates for the fabrication of thin films, e.g., of 50 microns in thickness and less, 30 microns in thickness or less, or even 10 microns in thickness or less, either from a melt (compression molding, extrusion cast) or from solution (solvent cast, spin cast). Further it is important that the molecular weight of the polyimide be as high as practically possible, while maintaining a resin devoid of gel particles from side reactions in the synthesis, capable of homogeneously mixing and dispersing any additional components and providing acceptable viscosity for processing (e.g. by extrusion and/or film casting) into a dielectric useful for generation of a capacitor.

More particularly, the polyimide resins provided may be isolated by antisolvent precipitation, dried according to procedures described in the aforementioned references and either melt extruded or redissolved and solution cast into a thin film useful for the production of a capacitor. Preferably the solution comprising the polyimide, organic compound containing nitrile and amine groups, and the solvent may be cast directly, without isolation, into a thin film comprising the functionalized polyimide by removal of the solvent ideally at elevated temperatures.

The polyimide resins provided may be converted to articles using processes such as film and sheet extrusion. Film and sheet extrusion processes may include and are not limited to melt casting, blown film extrusion and calendering. Films may have a thickness of 0.1 to 1000 micrometers in some instances. Co-extrusion and lamination processes may be employed to form composite multi-layer films or sheets. Single or multiple layers of coatings may further be applied to the single or multi-layer substrates. Coatings may be applied through standard application techniques such as rolling, spraying, dipping, brushing, or flow coating. Film and sheet may alternatively be prepared by casting a solution or suspension of the composition in a suitable solvent onto a substrate, belt or roll followed by removal of the solvent. Films may also be metallized using standard processes such as sputtering, vacuum deposition and lamination with foil.

Oriented films may be prepared through blown film extrusion or by stretching cast or calendered films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The resulting films, which may be either uniaxially or biaxially oriented, are expected to exhibit improved mechanical and dielectric properties as compared with films made from other polymers and even other polyimides not so functionalized. For example, thin films prepared from the present functionalized polyimide resins are expected to exhibit dielectric constants of about 2.75, or about 3.0, or about 3.25, or about 3.5, or about 3.75, or about 4.0, or even about 4.25, or even as high as 4.4. Further, the room temperature breakdown strength of these films can be as high as 500 V/micron, or 550 V/micron, or 600 V/micron, or 650 V/micron, or 700 V/micron, or 750 V/micron or even as high as 800 v/micron as measured in solvent-cast films of from about 7.5 to about 30 microns in thickness. As mentioned above, composite or unfilled films may be prepared, and the use of fillers, e.g., of nanometer dimensions of from about 0.1 nm to about 1000 nm, in amounts of less than about 40 volume percent, or less than about 30 volume percent, based upon the total weight of the film, is expected to further enhance the dielectric properties of the film, such as breakdown strength and voltage endurance, among others. The films can also be metallized, if desired.

Electronic articles may thus advantageously be prepared, partly or entirely, from such thin films. Examples of electronic articles that may benefit from the enhanced properties of the thin films include capacitors, sensors, batteries, flexible printed circuit boards, keyboard membranes, motor/transformer insulations, cable wrappings, industrial tapes, or interior coverage materials.

In some embodiments, the thin films may be used, e.g., as the dielectric layer of metallized film electrostatic capacitors. A typical metallized film capacitor includes a polymer film interposed between two electrodes on either side. The two electrodes include a layer of a metal such as aluminum, copper or zinc or their combination that is vacuum deposited on the polymer film that acts as a dielectric in the metallized film capacitor. In one embodiment of the present invention, a metallized film capacitor disclosed herein includes an electrode, typically made of a metal layer such as aluminum or zinc disposed (e.g., vacuum deposited) upon a first surface of a dielectric layer comprising the polyimide resins.

Turning now to the drawings, FIG. 2 is a diagrammatic illustration of a metallized film capacitor 20 in accordance with aspects of the invention. The metallized film capacitor 20 includes plastic foils 22 wound around a cylindrical surface 24 of the capacitor as final packaging. Lead wires 26 provide electrical connection for the metallized film capacitor 20 in a circuit. Technology used in the exemplary embodiment in constructing the metallized film capacitor is referred to as "wound" capacitor technology. In the "wound" capacitor technology, offset lengths of metallized foils are wound in a rolled cylinder. Metallized film capacitors in accordance with the invention are expected to provide electrical characteristics such as low dielectric loss factor and could be widely used for power electronics applications.

FIG. 3 represents a cross-sectional view of a portion of a metallized film capacitor 30 in accordance with the invention. The metallized film capacitor 30 includes an electrode 32, for example a cathode, upon which a dielectric layer 34 is disposed. In one example, the dielectric layer 34 is a thin film comprising the polyimide resin. Further, a metallized layer 36 is disposed on the dielectric layer 34, and acts as an anode.

The electrode 32 typically includes metal foils. In one embodiment, the electrode 32 includes at least one of aluminum, copper, or zinc foil. Thickness of the dielectric layer 34 may less than about 50 microns. In another exemplary embodiment, the thickness of the dielectric layer 34 may be less than 30 microns, or even less than 10 microns. Breakdown voltage of the dielectric layer 34 may be at least about 275 V/mm. The typical thickness of the metallized layer 36 may be in the range of from about 50 Å to about 500 Å.

Figure 4:
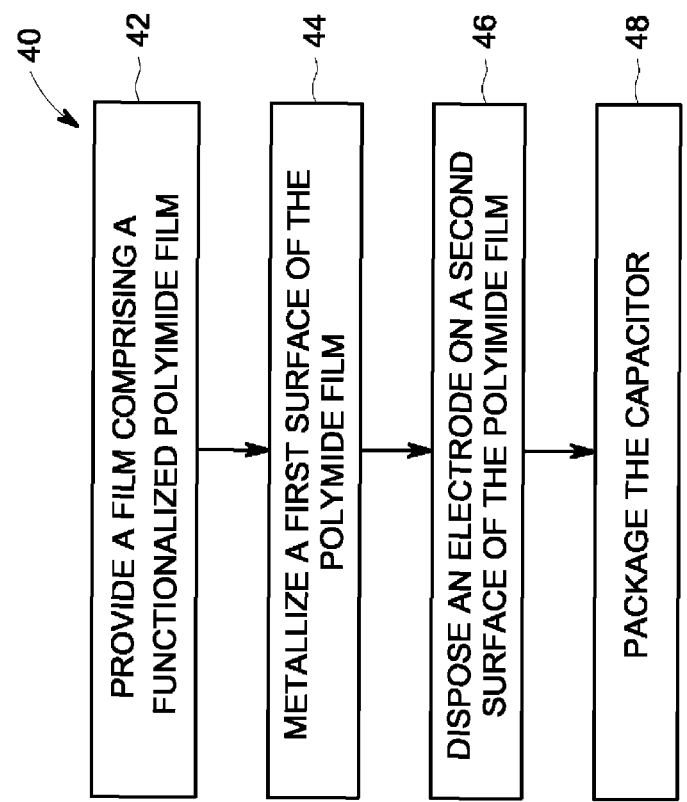
FIG. 4 is a flow chart representing steps in an exemplary method of making a metallized film capacitor with a dielectric layer comprising a polyimide resin as in FIG. 2, in accordance with one aspect of the invention.
Figure 5:
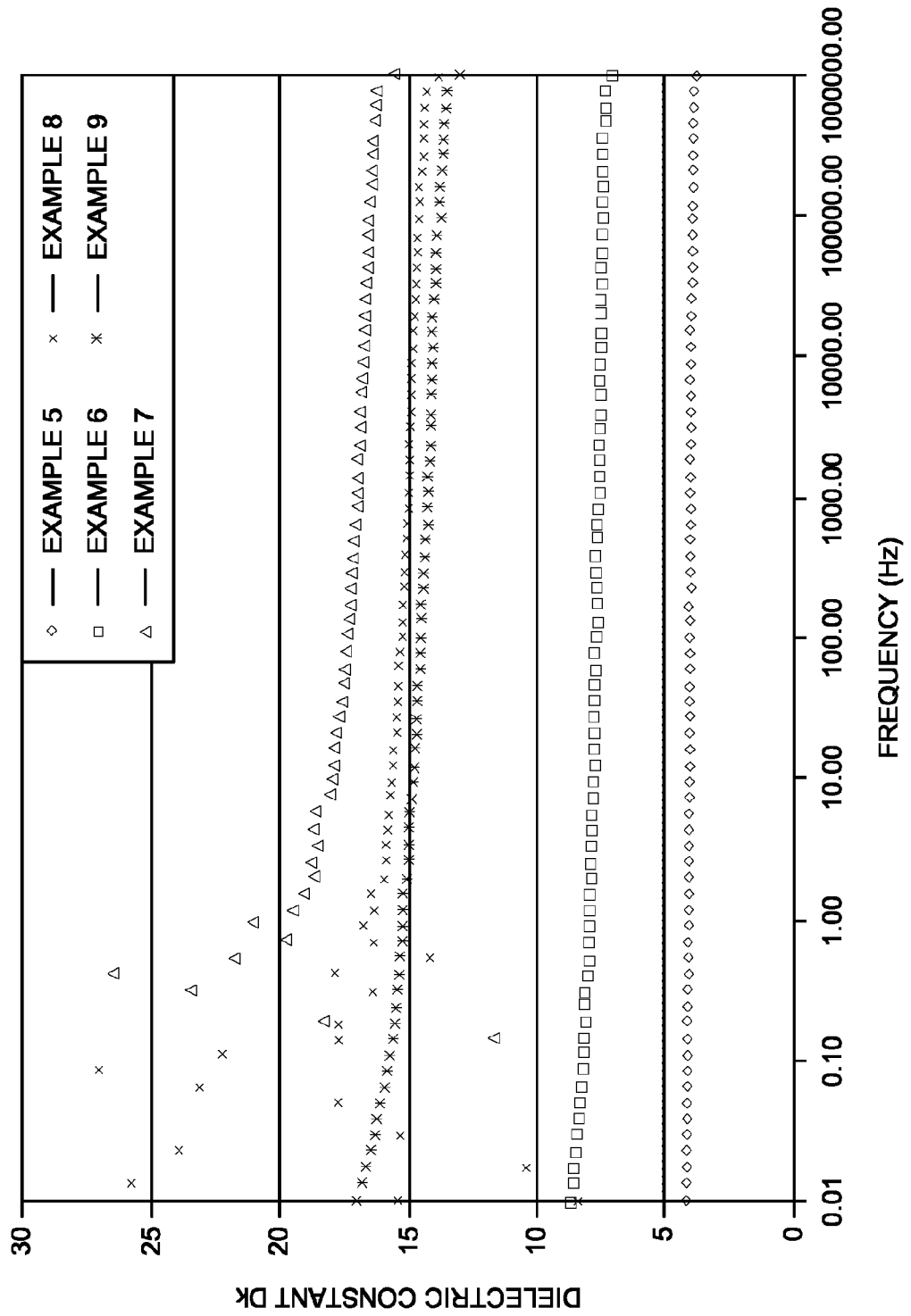
FIG. 5 is a graphical depiction of the dielectric constant as a function of frequency of comparative polyimide films and polyimide films according to some embodiments.

FIG. 4 is a flow chart illustrating exemplary steps involved in a method 40 of making a metallized film capacitor 30 as referenced to in FIG. 3, according to one embodiment of the invention. The method 40 includes providing a film comprising the polyimide resin at step 42.

A first surface of the polyimide film is then metallized at step 44. The metallizing at step 44 may include vapor deposition, sputtering or electrochemical deposition of the film. The process of vapor deposition, sputtering or electrochemical deposition may include depositing aluminum or copper, alone or in combination with zinc, on a first surface of the polyimide film. The method 40 also includes disposing an electrode on a second surface of the polyimide film at step 46. Finally, the metallized film capacitor is packaged at step 48.

The step 48 of packaging the capacitor will typically include winding and laminating the capacitor, and providing conductors or terminals for applying charge to the wound layers.

Since the energy stored by a capacitor per unit volume of the capacitor increases with the dielectric constant of the dielectric medium, a higher dielectric constant of the insulating layer of the capacitor would result in a higher stored energy density, or stored energy per unit volume of the capacitor. The higher breakdown strength of the dielectric layer (in V/micron) would also result in a higher energy density of the capacitor. Such capacitors would also be expected to have a higher voltage rating and/or higher resistance to corona discharge compared to capacitors made from other polymer films.

EXAMPLES

The examples presented below are intended to be merely illustrative, and should not be construed to be any sort of limitation on the scope of the claimed invention.

Example 1

A polyimide (CAS #77699-82-2), produced by condensation of 2,2-Bis[4-(3,4-dicarboxyphenoxy)phenyl]propane dianhydride (CAS#38103-06-9) and 4,4'-diaminodiphenyl sulfone (CAS#80-08-0) or obtained from commercial sources was dissolved in N-methylpyrrolidone to produce a 30 weight percent solution. The solution was heated for 18 h, allowed to cool and filtered to remove and insoluble particles. A small sample was solution cast onto a glass plate and the solvent removed by heating. The results of the dielectric measurements are given in Table 1, below.

Examples 2-4

Figure 6:
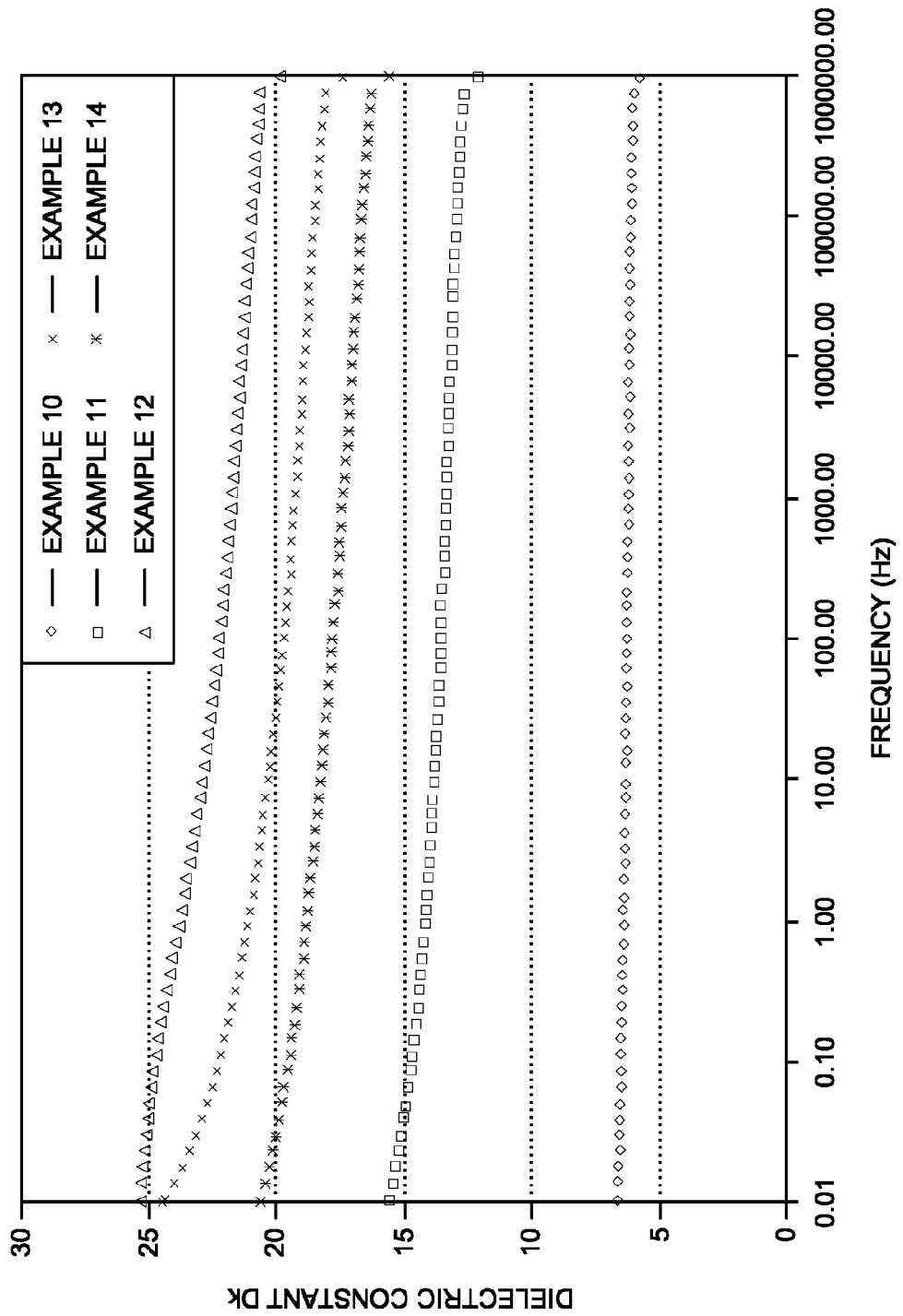
FIG. 6 is a graphical depiction of the dielectric constant as a function of frequency of comparative polyimide films and polyimide films according to some embodiments.
Figure 7:
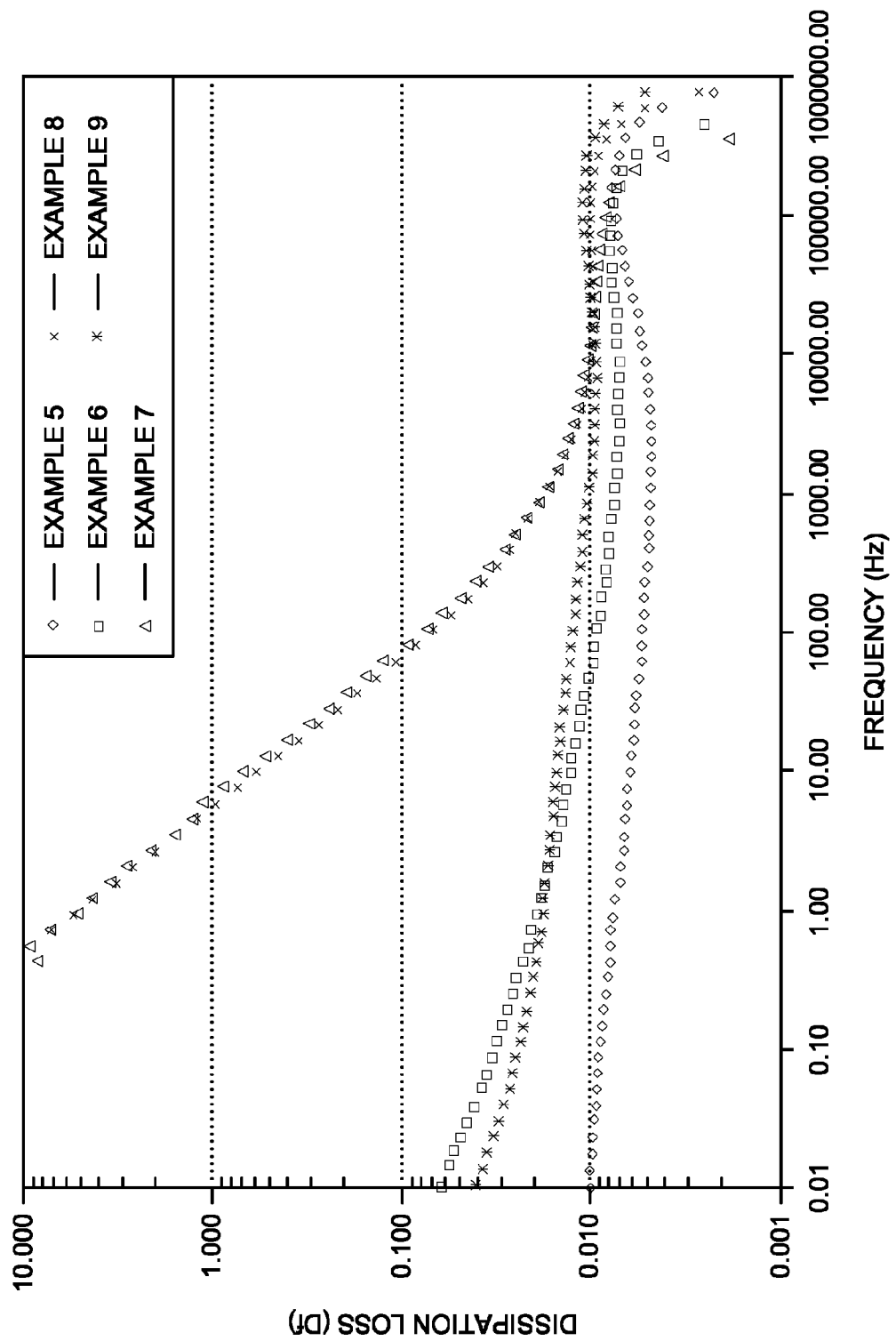
FIG. 7 is a graphical depiction of the dissipation loss (Df) as a function of frequency of comparative polyimide films and polyimide films according to some embodiments.
Figure 8:
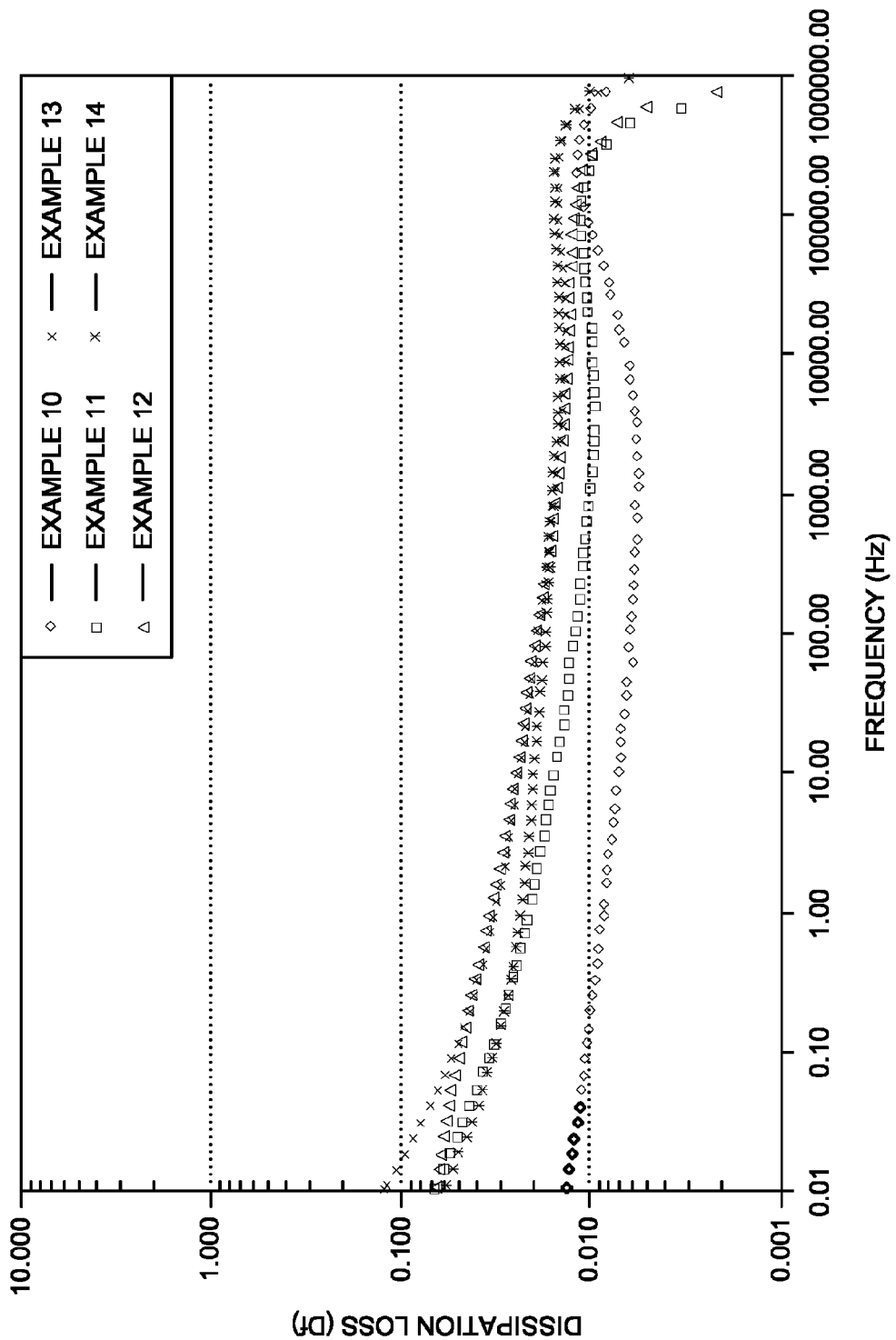
FIG. 8 is a graphical depiction of the dissipation loss (Df) as a function of frequency of comparative polyimide films and polyimide films according to some embodiments.

To a 30 weight percent N-methylpyrrolidone solution of the polyimide of Example 1 (275.00 g solution, 55.00 g polyimide; 75.1 mmole of repeating unit) heated at 80° C. was added either 1 or 2 molar equivalents of 3,3'-iminobis(propanenitrile) (CAS #111-94-4) as outlined in Table 1. The reaction between the polyimide and the iminobis(alkylnitrile) additive is shown schematically in FIG. 6. The solutions were heated for 18 h to promote the reaction, allowed to cool and filtered to remove and insoluble particles. The solution was cast onto a glass plate and the solvent removed by heating. The results of the dielectric measurements of the resulting film are given in Table 1, below.

TABLE 1

|  | Example 1 | Example 2 | Example 3 | Example 4 |
| --- | --- | --- | --- | --- |
| 30% XH6050/NMP solution (g) | 300 | 300 | 300 | 300 |
| XH6050 (g) | 90 | 90 | 90 | 90 |
| 2,2'-Iminobis(acetonitrile) (g) |  |  |  | 5.86 |
| 3,3'-Iminobis(propanenitrile) (g) |  | 7.59 | 15.19 |  |
| Film Properties: |  |  |  |  |
| Thickness (micron) | 8.20 | 10.20 | 10.10 | 9.20 |
| Std. Deviation (micron) | 0.50 | 0.30 | 0.30 | 1.20 |
| Dielectric Breakdown Strength (V/micron) | 642.00 | 606.00 | 607.00 | 658.00 |
| Std. Deviation (V/micron) | 46.00 | 43.00 | 42.00 | 76.00 |
| Dk (@1 MHz) | 2.98 | 3.18 | 4.41 | 3.69 |
| Df (@1 MHz) | 0.01 | 0.007 | 0.01 | 0.007 |
| Energy Density (J/cc) | 5.44 | 5.17 | 7.19 | 7.07 |

Example 5-14

A 25 weight percent N-methylpyrrolidone solution of the polyimide of Example 1 was heated at 80° C. in either the absence and presence of 2 molar equivalents of 3,3'-iminobis(propanenitrile) (CAS #111-94-4) as outlined in Table 2. The solution was heated for 18 h, allowed to cool and filtered to remove and insoluble particles. The solution was blended with $BaTiO_3$ nanoparticles with average size distributions of 10 and 100 nm in various amounts as outlined in Table 2. The solution was cast onto a glass plate and the solvent removed by heating. The results of the dielectric measurements of the resulting film are given in Tables 2A and 2B, below, and are shown in FIGS. 5-8.

TABLE 2A

|  | Example 5 | Example 6 | Example 7 | Example 8 | Example 9 |
|---|---|---|---|---|---|
| Composition: |  |  |  |  |  |
| Sample ID | XH6050 Control | 15 vol % 10 nm BaTiO3 in XH6050 | 30 vol % 10 nm BaTiO3 in XH6050 | 15 vol % 10 nm, 15 vol % 100 nm BaTiO3 in XH6050 | 30 vol % 100 nm BaTiO3 in XH6050 |
| 20% XH6050/N-methylpyrrolidone solution (g) | 25.00 | 25.00 | 25.00 | 25.00 | 25.00 |
| XH6050 (g) | 5.00 | 5.00 | 5.00 | 5.00 | 5.00 |
| 3,3'-Iminobispropanenitrile (g) | 0.00 | 0.00 | 0.00 | 0.00 | 0.00 |
| 3,3'-Iminobispropanenitrile (mmol) | 0.00 | 0.00 | 0.00 | 0.00 | 0.00 |
| $BaTiO_3$ (10 nm particle size) (vol %) | 0.00 | 15.00 | 30.00 | 15.00 | 0.00 |
| $BaTiO_3$ (10 nm particle size) (ml) | 0.00 | 0.67 | 1.62 | 0.81 | 0.00 |
| $BaTiO_3$ (10 nm particle size) (g) | 0.00 | 3.90 | 9.48 | 4.74 | 0.00 |
| $BaTiO_3$ (100 nm particle size) (vol %) | 0.00 | 0.00 | 0.00 | 15.00 | 30.00 |
| $BaTiO_3$ (100 nm particle size) (ml) | 0.00 | 0.00 | 0.00 | 0.81 | 1.62 |
| $BaTiO_3$ (100 nm particle size) (g) | 0.00 | 0.00 | 0.00 | 4.74 | 9.48 |
| BaTiO3 Filler volume % | 0 | 0.15 | 0.3 | 0.3 | 0.3 |
| BaTiO3 Filler weight % | 0 | 0.44 | 0.65 | 0.65 | 0.65 |
| Film Properties: |  |  |  |  |  |
| Thickness (micron) | 12.4 | 12.0 | 18.4 | 30.6 | 27.6 |
| Dielectric Breakdown Strength (V/micron) | 370 | 144 | 101 | 168 | 192 |
| Std. Deviation (V/micron) | 15 | 17 | 14 | 10 | 9 |
| Dk | 3.96 | 7.59 | 17.00 | 14.94 | 14.20 |
| Df | 0.0048 | 0.0074 | 0.0171 | 0.0166 | 0.0102 |
| Tg (° C.) | 247 | NM | NM | NM | NM |
| Energy Density (Joule/cc) | 2.40 | 0.70 | 1.87 | 0.77 | 2.32 |

TABLE 2B

|  | Example 10 | Example 11 | Example 12 | Example 13 | Example 14 |
|---|---|---|---|---|---|
| Composition: |  |  |  |  |  |
| Sample ID | XH6050CN Control | 15 vol % 10 nm BaTiO3 in XH6050CN | 30 vol % 10 nm BaTiO3 in XH6050CN | 15 vol % 10 nm, 15 vol % 100 nm BaTiO3 in XH6050CN | 30 vol % 100 nm BaTiO3 in HX6050CN |
| 20% XH6050/N-methylpyirolidone solution (g) | 25.00 | 25.00 | 25.00 | 25.00 | 25.00 |
| XH6050 (g) | 5.00 | 5.00 | 5.00 | 5.00 | 5.00 |
| 3,3'-Iminobispropanenitrile (g) | 1.55 | 1.55 | 1.55 | 1.55 | 1.55 |
| 3,3'-Iminobispropanenitrile (mmol) | 12.61 | 12.61 | 12.61 | 12.61 | 12.61 |
| $BaTiO_3$ (10 nm particle size) (vol %) | 0.00 | 15.00 | 30.00 | 15.00 | 0.00 |
| $BaTiO_3$ (10 nm particle size) (ml) | 0.00 | 0.87 | 2.12 | 1.06 | 0.00 |
| $BaTiO_3$ (10 nm particle size) (g) | 0.00 | 5.12 | 12.43 | 6.21 | 0.00 |
| $BaTiO_3$ (100 nm particle size) (vol %) | 0.00 | 0.00 | 0.00 | 15.00 | 30.00 |
| $BaTiO_3$ (100 nm particle size) (ml) | 0.00 | 0.00 | 0.00 | 1.06 | 2.12 |
| $BaTiO_3$ (100 nm particle size) (g) | 0.00 | 0.00 | 0.00 | 6.21 | 12.43 |
| $BaTiO_3$ Filler volume % | 0 | 0.15 | 0.3 | 0.3 | 0.3 |
| $BaTiO_3$ Filler weight % | 0 | 0.49 | 0.7 | 0.7 | 0.7 |
| Film Properties: |  |  |  |  |  |
| Thickness (micron) | 11.0 | 9.8 | 28.4 | 28.8 | 27.2 |
| Dielectric Breakdown Strength (V/micron) | 421 | 291 | 173 | 184 | 174 |
| Std. Deviation (V/micron) | 10 | 13 | 9 | 10 | 6 |
| Dk | 6.22 | 13.34 | 21.74 | 19.25 | 17.37 |
| Df | 0.0055 | 0.0098 | 0.015 | 0.0149 | 0.0156 |
| Tg (° C.) | 182 | NM | NM | NM | NM |
| Energy Density (Joule/cc) | 4.88 | 5.00 | 2.88 | 2.88 | 2.33 |

As shown in Tables 2A and 2B, adding 10 nm BaTiO3 particles to either the functionalized polyimide, or the unfunctionalized polyimide, produced an increase in the dielectric constant of the polymer. However, replacing half or all of the 10 nm particles in the composites containing 30 volume percent of filler with larger, 100 nm particles caused the dielectric constant of the composite to decrease.

Tables 2A and 2B also show that the dielectric constant of the functionalized polyimide is about 50% higher than the dielectric constant of the unfunctionalized polymer. Further, the dielectric constants of the filled functionalized polyimides were higher than those for the filled, unfunctionalized polyimides, suggesting that some interaction occurred between the surface of the filler and the functional groups in the polyimide. The same is true for the breakdown strength and energy density values of most of the compositions investigated. In particular, the energy density of the composition comprising the functionalized polyimide and 15 vol % BaTiO3 particles (5 J/cc) was about 7 times higher than that of the composition comprising the unfunctionalized polyimide and 15 vol % of the same particles (0.7 J/cc).

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

The invention claimed is:

1. A polyimide resin comprising at least one residue selected from Formulas 1-4:

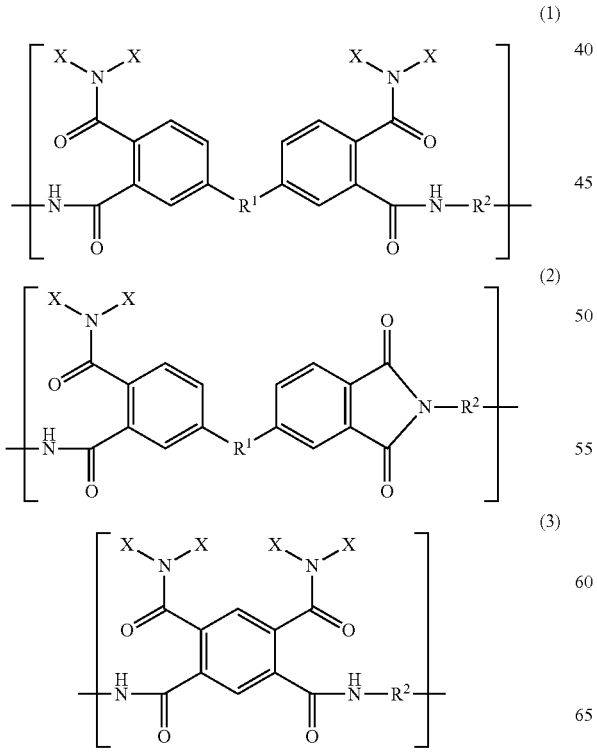

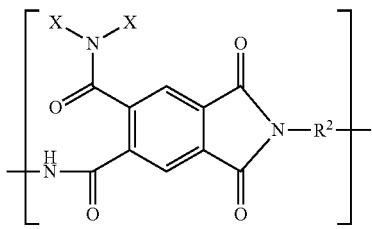

wherein each X is independently a $C_1$-$C_{10}$ hydrocarbon unsubstituted or substituted with an atom or group independently selected from the group consisting of CN, F, $SO_2$, SO, S, $SO_3H$, $SO_3^-$, PO, $PO_2H$, $PO_3H$, $PO_2^-$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, $OTi(OR^3)_3$, $OSi(OR^3)_3$ wherein $R^3$ is a $C_{1-10}$ aliphatic or aromatic hydrocarbon residue and at least one X is a $C_1$-$C_{10}$ hydrocarbon substituted with at least one member selected from CN, F, $SO_2$, SO, S, $SO_3H$, $SO_3^-$, PO, $PO_2H$, $PO_3H$, $PO_2^-$, $PO_3^{-2}$, CO, $CO_2^-$, $CO_2H$, CONH, $CONH_2$, NHCOHN, OCONH, $OCO_2$, N, NH, $NH_2$, $NO_2$, CSNH, $CSNH_2$, NHCSNH, $OTi(OR^3)_3$, $OSi(OR^3)_3$ wherein $R^3$ is a $C_{1-10}$ aliphatic or aromatic hydrocarbon residue, $R^1$ is selected from the group consisting of a carbon-carbon single bond, a heteroatom containing group, the residuum of a bisphenol or a $C_1$-$C_{50}$ hydrocarbon unsubstituted or substituted with an atom or group selected from the group consisting of O, S, O=S=O, S=O, P=O, C=O, —$CO_2$—, —CONH—, —$CONH_2$, —NHCOHN—, —OCONH—, —$OCO_2$—, N, —NH, —$NH_2$, —$NO_2$, —Cl, —F, —CSNH—, —$CSNH_2$, —NHCSNH—, and/or —CN and $R^2$ is selected from the residuum of a diamine and a $C_1$-$C_{50}$ hydrocarbon unsubstituted or substituted with an atom or group selected from the group consisting of O, S, O=S=O, S=O, P=O, C=O, —$CO_2$—, —CONH—, —$CONH_2$—NHCOHN—, —OCONH—, —$OCO_2$—, N, —NH, —$NH_2$, —$NO_2$, —Cl, —F, —CSNH—, —$CSNH_2$, —NHCSNH—, and/or —CN.

2. The polyimide resin of claim 1, wherein at least one X is a $C_1$-$C_{10}$ hydrocarbon substituted with at least one member selected from CN, F or $SO_2$.

3. The polyimide resin of claim 2, wherein at least one X is a $C_1$-$C_{10}$ hydrocarbon substituted with at least one member selected from CN.

4. The polyimide resin of claim 3, derived from a polyetherimide.

5. The polyimide resin of claim 4, derived from a polyetherimide sulfone.

6. The polyimide resin of claim 5, according to Formula 5, below:

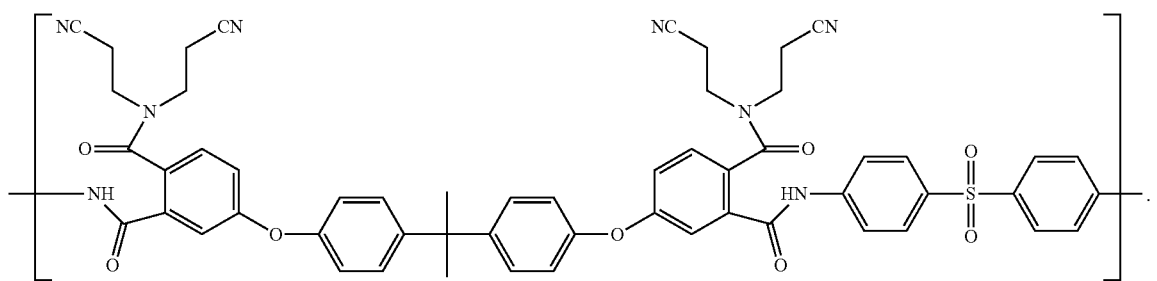
\* \* \* \* \*